CHARLES J. STALEGO,
HAROLD E. LEAMAN,
CLETIS L. ROBERSON
& ROGER W. ROTH
INVENTORS

BY

ATTORNEYS

CHARLES J. STALEGO,
HAROLD E. LEAMAN,
CLETIS L. ROBERSON
& ROGER W. ROTH
INVENTORS

BY
*[signature]*
ATTORNEYS

CHARLES J. STALEGO,
HAROLD E. LEAMAN,
CLETIS L. ROBERSON
& ROGER W. ROTH
INVENTORS

BY
ATTORNEYS

United States Patent Office 3,282,667
Patented Nov. 1, 1966

3,282,667
METHOD OF MAKING HOLLOW GLASS FIBERS
Charles J. Stalego, Harold E. Leaman, and Cletis L. Roberson, Newark, and Roger W. Roth, Granville, Ohio, assignors to Owens-Corning Fiberglas Corporation, a corporation of Delaware
Filed Aug. 30, 1962, Ser. No. 220,516
6 Claims. (Cl. 65—8)

This invention relates to hollow fibers or filaments and to method of and apparatus for forming hollow or tubular filaments or fibers and more especially to the formation of hollow filaments or fibers of heat-softenable material through the utilization of centrifugal forces.

Methods have been employed for forming comparatively fine fibers and filaments of mineral material such as glass by attenuation through the use of high velocity attenuating blasts and by winding the filaments in strand formation on a rotatable collector. Continuous filaments of conventional character have been made utilizing a rotor fashioned with a plurality of small openings or orifices through which heat-softened glass is extruded under centrifugal forces of rotation of the rotor and the continuous fine filaments collected in strand formation, the strand being particularly usable for textile purposes. A rotary process for producing continuous solid filaments of glass or similar material is disclosed in Patent 3,040,377 granted June 26, 1962.

Efforts have been heretofore directed to producing hollow fibers of glass as distinguished from conventional glass tubing but no satisfactory method has heretofore been devised for producing hollow fibers or hollow continuous filaments.

The present invention embraces the provision of a method of forming substantially continuous hollow filaments or fibers of heat-softenable material such as glass which filaments or fibers are comparable in size to conventional solid filaments or fibers, the method being adaptable for high rate of production of hollow fibers or filaments.

An object of the invention is the provision of a method of forming hollow filaments or fibers of heat-softened material through the utilization of centrifugal forces wherein the heat-softened material is projected from a rotating chamber or rotor under conditions wherein the heat-softened material is of a viscosity and is restricted in amount whereby the projected material is in hollow or tubular formation.

Another object of the invention resides in a method of processing heat-softenable filament forming material which embraces the steps of restricting or metering the flow rate or delivery of the material into a rotating orificed walled chamber or rotor and conditioning the material to a viscosity to form a thin film of material on the walled region which material, under the influence of centrifugal forces, does not bridge the orifices but is projected through the orifices as thin walled tubular fibers or filaments.

Another object of the invention embraces a method of processing heat-softenable filament-forming mineral material wherein material is delivered into a rotating chamber having an orificed walled region, the delivery of the material into the chamber being restricted and the material conditioned by heat applied thereto in the chamber so as to promote the formation of a thin film of the material on the orificed wall region of the chamber, and the material of the film within the chamber delivered by centrifugal forces through the orifices whereby air moves through the central region of the orifices and promotes the formation of thin walled tubular continuous filaments of the material.

An object of the invention resides in a method of producing hollow continuous filaments utilizing centrifugal forces wherein the hollow filaments are of comparatively small outside diameter and are usable for forming insulating mats or batts or are usable for forming textile strands, yarns or threads.

Another object of the invention resides in a method of producing hollow fibers by centrifugal forces and orienting the hollow fibers or filaments into fibrous mats wherein the strength of a mat embodying the hollow fibers is greatly increased over a mat of solid fibers of the same size and wherein the density may be substantially reduced thus effecting substantial savings of glass particularly where the hollow fibers may have voids of upwards of 50% or more.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which.

Figure 1:
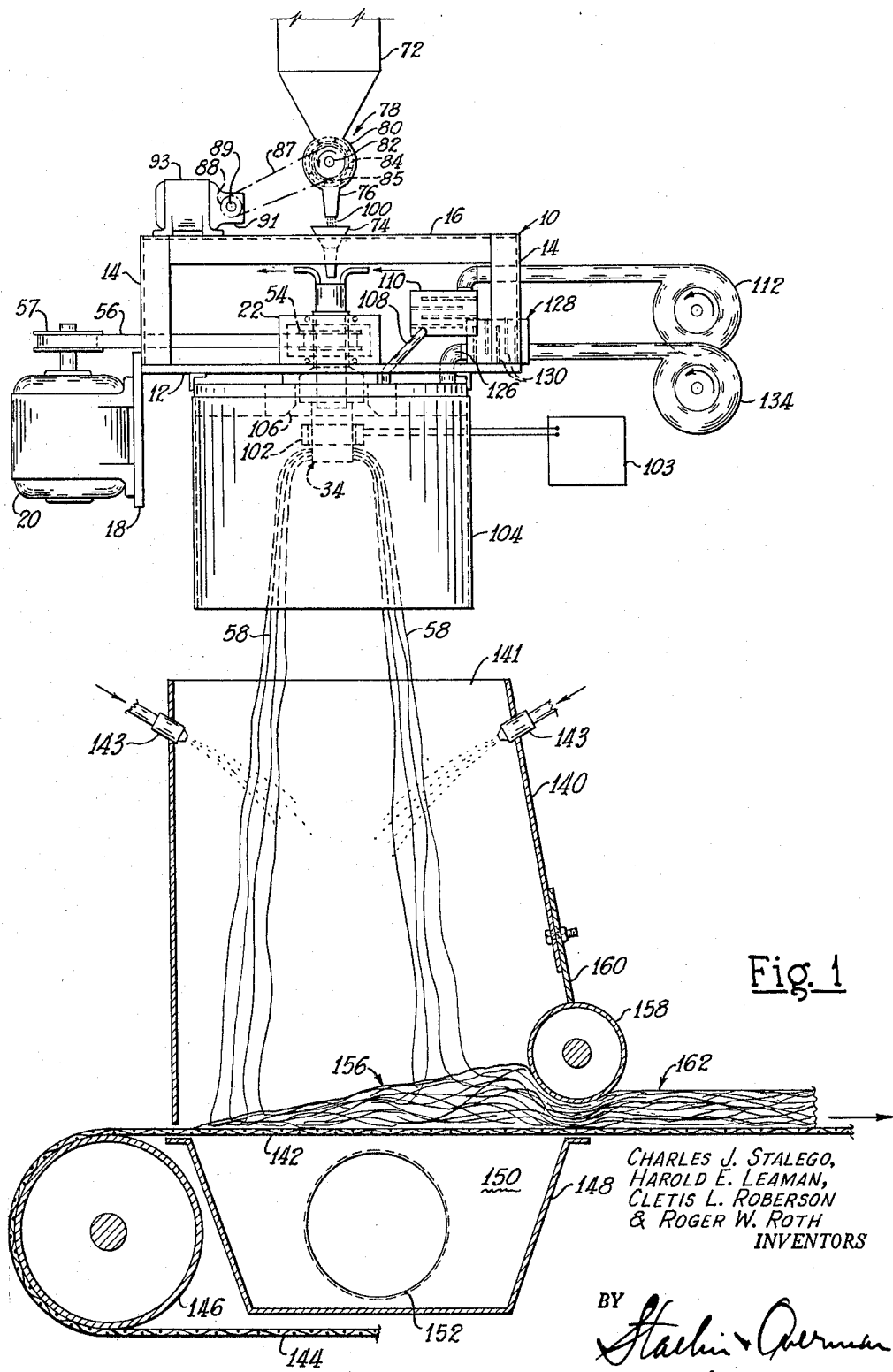
FIGURE 1 is a semi-diagrammatic elevational view illustrating a form of apparatus for performing the steps in the method of the invention.

While the method and apparatus of the invention are particularly usable for forming fine, hollow filaments or fibers of glass, it is to be understood that the invention may be utilized for forming fine, hollow filaments from other heat-softenable mineral materials or filament-forming resins.

With particular reference to the apparatus illustrated in FIGURES 1 through 4 for carrying out the method of forming fine hollow filaments or fibers of glass or other heat-softenable filament-forming material, the arrangement is inclusive of a support or frame construction 10 comprising a mounting plate 12, upwardly extending struts 14, the latter supporting horizontal members 16. A bracket 18 carried by the mounting plate 12 supports an electrically energizable motor 20 for rotating a rotor or chamber 34.

Mounted on plate 12 is a supplemental frame 22 which includes parallel horizontal plates 24, each plate providing a support for an anti-friction bearing such as a ball bearing 26. Journaled in the bearings 26 is a hollow or tubular sleeve 28 of annular cross-section formed with a truncated cone-shaped or flaring portion 30 joined with a depending cylindrical wall or wall portion 32 arranged to support the rotor or chamber 34. The rotor construction 34 is inclusive of a circular cylindrical wall 36 and a bottom wall 38, the rotor being of platinum rhodium alloy or other material which will withstand high temperatures. The upper end of the wall 36 is provided with an outwardly extending circular flange 40.

Figure 2:
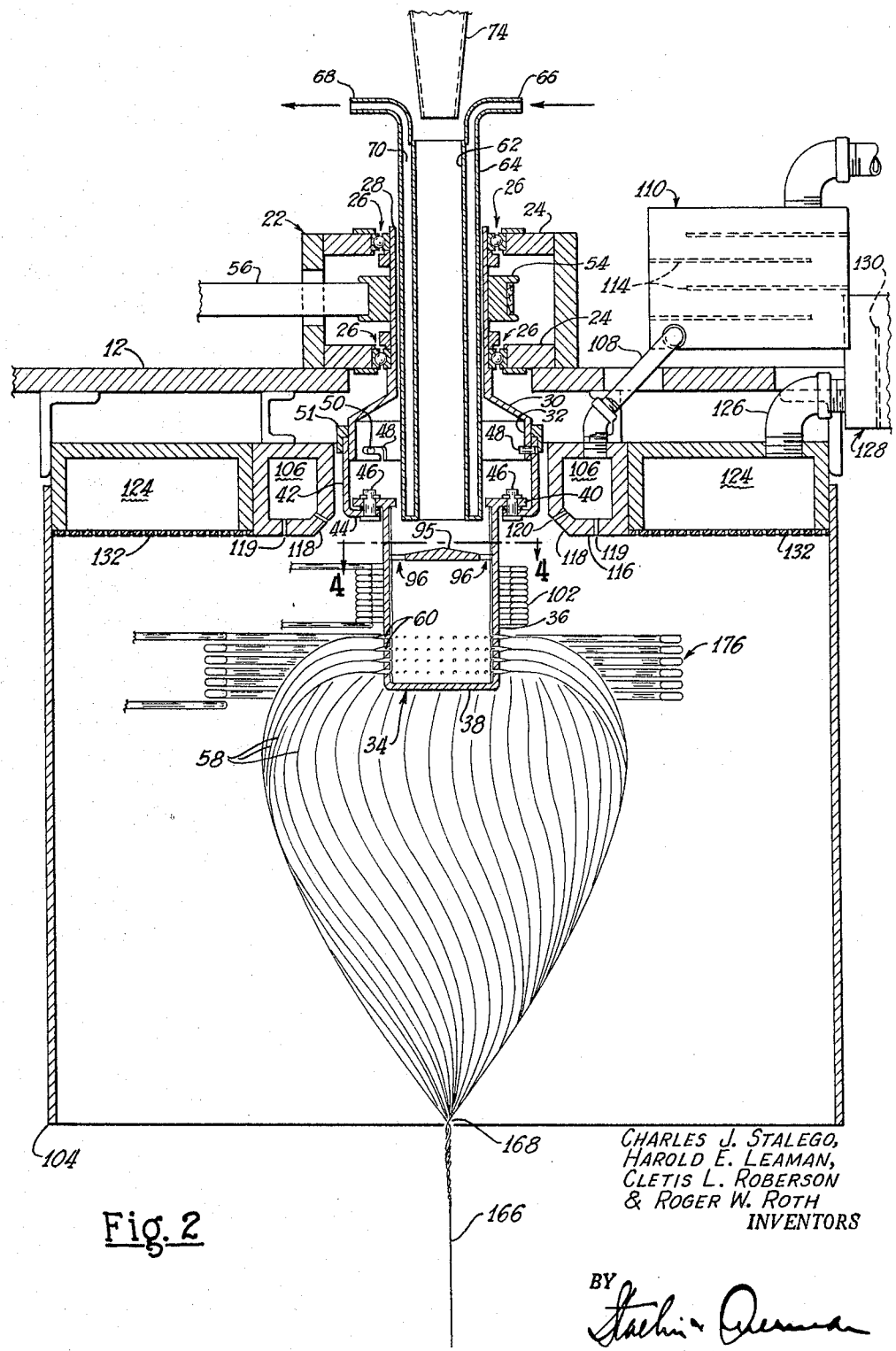
FIGURE 2 is a vertical sectional view through a portion of the arrangement illustrated in FIGURE 1.

As particularly shown in FIGURE 2, a thin walled cylindrically-shaped collar 42 is formed with an inwardly extending flange 44 which is joined with the flange 40 on the rotor by means of pins 46 or other securing means to establish a drive connection between the collar 42 and the rotor 34.

The depending wall portion 32 is formed with circumferentially spaced bayonet-type slots 48 which accommodate radially projecting pins 50 mounted on the sleeve portion 32 to provide a drive connection between the sleeve 28 and the rotor. A locking ring 50 surrounds the depending wall 32 and is vertically slidable for engagement with the depending wall 32 to prevent disengagement of the pins 50 from the slots 48 which establish a drive connection to the rotor. Secured to the sleeve 28 is a pulley 54 engaged by a driving belt 56 which engages a pulley 57 driven by the motor 20, as shown in FIGURE 1.

The circular cylindrical wall 36 of the rotor or chamber 34 is comparatively thin walled and is of comparatively small diameter, for example, about 1¼ inches inside diameter, although a larger size rotor may be employed, the rotor being adapted to be driven or rotated at a comparatively high speed to set up or establish centrifugal forces of a magnitude to project heat-softened or flowable material within the rotor through small orifices 60 formed in a lower region of the rotor wall 36, the orifices being preferably arranged in vertically spaced rows, as shown in FIGURE 2.

Any number of small orifices 60 may be employed depending upon the number of hollow fibers or filaments 58 desired to be formed. The orifices 60 are of comparatively small size in order to promote the formation of fine hollow fibers or filaments as hereinafter explained. The filament or fiber forming material, such as glass, is introduced into the rotatable chamber or rotor 34 through a guide means such as a tube 62 surrounded by jacket 64, the ends of the jacket being closed to accommodate a circulating cooling fluid such as water. The cooling jacket is provided at its upper end with a fluid inlet 66 and an outlet 68.

The circulation of cooling fluid through the annular chamber 70 provided by the jacket 64 is effective to maintain the guide tube 62 and sleeve 28 at safe operating temperatures. The material for forming the hollow fibers or filaments may be fed or delivered into the rotor in particulate or granular form, such as glass batch or crushed glass cullet, through an arrangement illustrated in FIGURE 1 or the material may be reduced to flowable condition or rendered molten by heat and a stream of the softened material delivered into the rotor in the manner illustrated in FIGURE 6.

With particular reference to the arrangement for delivering glass batch or cullet into the rotor, as illustrated in FIGURES 1 and 2, the feeding means is of a character to control, restrict or meter the delivery rate of the material into the rotor as the delivery rate is an important factor in the production of hollow fibers or filaments through the method of the invention.

As illustrated in FIGURE 1, a hopper 72, adapted to contain a supply of the filament-forming material in particulate or granular form, is disposed above a funnel or chute 74 mounted on the frame 10, the chute directing the material into the guide tube 62.

The hopper is equipped with a discharge tube 76 in registration with the chute 74. The arrangement includes a means 78 for metering, regulating or restricting the rate of feed or delivery of the material into the rotor. The lower end of the hopper 72 is formed with a cylindrically-shaped chamber 80 in which is journalled a shaft 82 equipped with a feed wheel 84 provided with radially arranged vanes 85 having rotating clearance in the chamber 80. The rotating vanes 85 engage material in the lower end of the hopper and meter or regulate the feed of the material 100 delivered into the tube 76.

A sprocket on the shaft 82 is connected by means of a chain 87 with a sprocket 88 mounted upon a shaft 89. The shaft 89 is associated with speed reducing mechanism or gearing contained in a housing 91, the speed reducing mechanism being operated by an electrically energizable motor 93. The speed reducing mechanism in the housing 91 is of conventional adjustable variable speed type in order to vary the rate of rotation of the feed drum 84 and thereby accurately meter or regulate the delivery of material from the hopper to the rotor 34.

Figure 4:
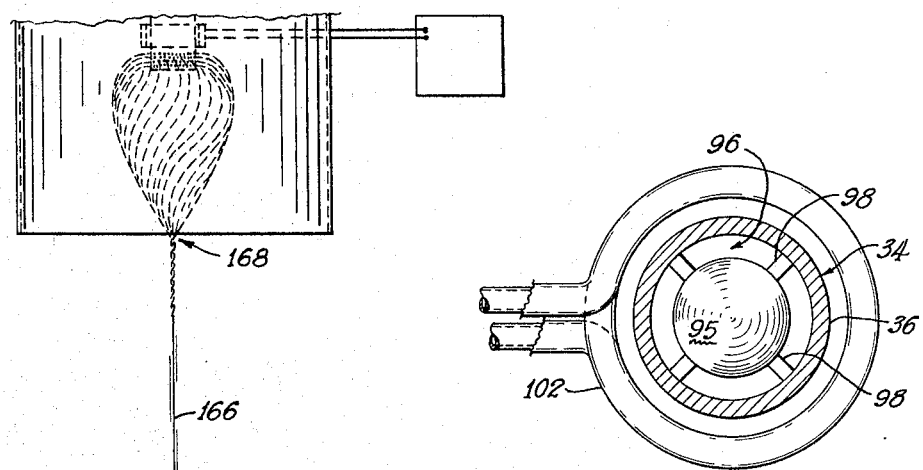
FIGURE 4 is a sectional view through the rotating chamber, the view being taken substanially on the line 4—4 of FIGURE 2.

Positioned within the upper portion of the rotor 34 is a plate, distributor or platform 95, particularly shown in FIGURES 2 and 4, the upper surface of the platform being preferably slightly frusto-conical, as shown in FIGURE 2, the platform being of circular contour and of lesser diameter than the inside diameter of the wall 36 of the rotor 34, providing an annular space 96 adjacent the rotor wall for the passage of material. The platform is preferably supported by radial struts 98 welded or otherwise secured to the rotor wall 36 whereby the platform or distributor is rotated with the rotor.

The particulate or finely divided material 100 descends by gravity from the chute 74 through the guide tube 62 and impinges or engages the distributing member or platform 95 and is projected outwardly by centrifugal forces of rotation into contact with the inner surface of the wall 36 of the rotor. Means is provided for applying heat to the rotor which, in connection with the processing of granular material 100, reduces the material to a molten or flowable state or condition within the rotor.

In the arrangement illustrated in FIGURES 1 and 2, high frequency electric current is utilized for inductively heating the rotatable rotor or chamber to a temperature to rapidly fuse or reduce the particulate or finely divided material 100 to a flowable condition whereby a comparatively thin film of heat-softened material is maintained on the inner surface of the rotor wall 36.

An induction heating coil 102 surrounds the rotor wall 36 above the region of the orifices or outlets 60, the coil 102 being connected with a power supply 104, indicated schematically in FIGURE 1.

The power supply is of a character to produce a current of high frequency of about ten thousand cycles or more per second supplied to the induction coil 102. The metal conductors of the coil are preferably water cooled. The rotor 34 is rotated at a speed of upwards of seven thousand or more r.p.m. If the diameter of the rotor is increased, the speed would be proportionately reduced.

The apparatus above described is utilized in forming tubular or hollow, fine, substantially continuous filaments or fibers of the fused or molten glass within the rotor. Important factors in the formation of hollow filaments through the process of the invention are the maintenance of an extremely thin film or restricted quantity of fused material on the inner surface of the wall 36 of the rotor 34 and of a comparatively high viscosity whereby the material is in a viscous but mobile state or condition.

In such condition the magnitude of the centrifugal forces operative to project the molten glass through the orifices is effective to overcome or exceed the surface tension of the heat-softened viscous glass, and by reason of the extremely thin film or restricted or starved amount or quantity of glass on the surface of the rotor, the glass does not bridge the orifices.

Another factor influencing the promotion of the formation of hollow filaments or fibers is that the glass moving through an orifice in the rotor is in the form of a very thin film adjacent the orifice wall defining the hollow or tubular region of the hollow fiber which is occupied by air from the rotor.

The air in the motor is influenced by a differential or reduced pressure within the hollow or tubular configuration of the glass whereby air from the rotor moves into the hollow region of the fiber by suction of the centrifugally projected outwardly moving glass which establishes a subatmospheric or reduced pressure to promote the flow of air from the rotor into each hollow fiber as it is formed. Thus the air in the central or core region of the hollow fiber provides a barrier preventing the glass from bridging the orifice which, coupled with the low surface tension of the glass because of its high viscosity, results in the formation of practically continuous hollow filaments or fibers being projected from the high speed rotor.

The material feeding or metering arrangement 78 is adjusted so as to restrict the rate of delivery of filament-forming material into the rotor so that the region of the interior surface of the rotor 36 adjacent the orifices is starved of glass so that only a minutely thin film or quantity of the glass of high viscosity is maintained on the rotor wall.

The hollow fibers made according to the method of the invention are very fine in size comparable to solid filaments or fibers which have heretofore been made on an apparatus similar to that herein described through the action of centrifugal forces.

It is desirable to provide an environment of heated air exteriorly of the rotor to progressively reduce the temperature of the hollow filaments or fibers as they move outwardly from the rotor under the influence of centrifugal forces. Air which has been heated to a temperature substantially lower than the temperature of the filaments is delivered into the environment surrounding the rotor at a comparatively low flow rate to provide downwardly moving air streams in the nature of a gentle breeze to retard outward movement of the filaments and to direct the filaments downwardly as shown in FIGURES 1 and 2.

In the arrangement illustrated in FIGURES 1 and 2, a cylindrically-shaped shroud or guard 104 surrounds the rotor and filament or fiber attenuating region, the shroud depending from the frame plate 12. Surrounding the coupling or collar 42 and preferably concentric with the axis of the rotor is an annular chamber or manifold 106 connected by a pipe 108 with a heating chamber 110 into which air is delivered from a blower 112. The chamber 110 is equipped with electrically energized heating strips or units 114 for heating the incoming air in the chamber prior to its delivery into the annular plenum chamber 106.

A lower wall 116 and an angularly arranged wall 118 of the plenum chamber are provided with rows of openings 119 and 120 arranged to direct heated air from the plenum chamber inwardly toward the rotor and downward into the environment occupied by the hollow filaments moving outwardly from the rotor. The heater 110 is adapted to heat the air to a temperature of about 500° F. or more, the air being delivered through openings 119 and 120 preferably at a very low velocity to influence movement of the hollow filaments downwardly and to retard cooling of the centrifuged filaments.

A second plenum chamber 124 may be provided surrounding the first plenum chamber 106 adapted to deliver air within the shroud 104, the air being heated but of a temperature lower than that of the air delivered from the plenum chamber 106. The chamber 124 is connected by a tube 126 with a heating chamber 128 containing electrically energizable heating strips or units 130 for pre-heating air for delivery through openings or perforations in a perforated plate or screen 132.

Air may be supplied to the electric heating unit 128 by a blower 134. Likewise, air flow through the perforated plate 132 is at a comparatively low velocity, and is preferably of a temperature of between 100° and 300° F. but may be at other temperatures, if desired. Through the arrangement of the plenum chambers 106 and 124 delivering warm air of different temperatures into the shroud or circular enclosure 104, a decreasing temperature gradient is established outwardly of the axis of the rotor 44.

The arrangement illustrated in FIGURE 1 is inclusive of means for collecting the hollow filaments or fibers into a mass or mat which may be employed for various end uses. The filament collecting apparatus includes a hood or enclosure 140, the entrance 141 of which is in registration with the shroud or guard 104 whereby the filaments or fibers are delivered into the hood 140. A suitable adhesive or binder is delivered onto the filaments or fibers by applicators 143. Disposed at the lower end of the hood is the upper flight 142 of a foraminous or reticulated conveyor 144 of the endless belt type which is supported by rolls 146, one of which is shown in FIGURE 1. Disposed beneath the flight 142 of the conveyor and in registration with the hood 140 is a receptacle 148 defining a suction chamber 150, the chamber being connected by means of a pipe 152 with a suction blower (not shown) for establishing subatmospheric or reduced pressure in the chamber 150. The reduced pressure or suction in chamber 150 is effective through the openings in the foraminous conveyor flight for assisting in collecting the hollow filaments or fibers 58 in a mass on the conveyor flight 142. The exit region of the hood 140 is equipped with a sizing roll 158 which is carried by a bracket 160 which is adjustable with respect to the hood 140. The sizing roll 158 may be raised or lowered to partially compress the mass of hollow filaments or fibers 156 to a desired thickness as the mass is conveyed beneath the roll 158 by the upper flight 142 of the conveyor moving in a right-hand direction as viewed in FIGURE 1. The function of the sizing roll 158 is to predetermine the thickness of the mat 162 formed of the hollow filaments or fibers. The mat of hollow filaments or fibers bearing the adhesive or binder is conveyed to a curing station to set the adhesive or binder.

Figure 5:
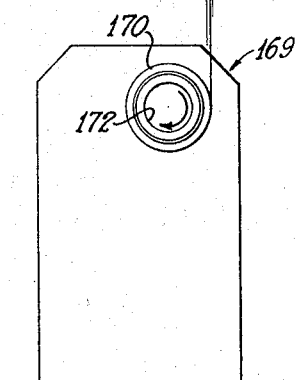
FIGURE 5 is an elevational view illustrating the method of packaging a strand of hollow filaments.
Figure 3:
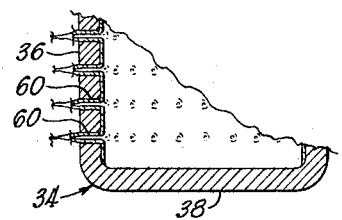
FIGURE 3 is a fragmentary detailed sectional view of an orificed portion of a rotating chamber illustrating the orientation of the heat-softened material moving through the orifices.

FIGURES 2 and 5 illustrate the filament or fiber-forming apparatus of FIGURE 1 wherein continuous hollow filaments are formed into a strand 166, the continuous filaments converging at a region 168 beneath the rotor and twisted into a strand by the rotation of the rotor. The strand 166 may be collected upon a winder or packaging unit 168, the strand being collected upon a tubular sleeve or collector 170 mounted upon a rotating collet 172 driven by a motor (not shown).

As shown in FIGURE 2, an additional electrical induction heating means 176 may be provided surrounding and in horizontal alignment with the region of the rotor provided with the orifices 60 for heating the orificed portion of the rotor. The induction heater 176 is energized by high frequency current from a generator or power supply. In the arrangement above described, the glass batch or cullet is heated in the rotor to a molten state or condition so as to provide the minutely thin film of viscous glass for the formation of continuous hollow glass filaments.

Figure 6:
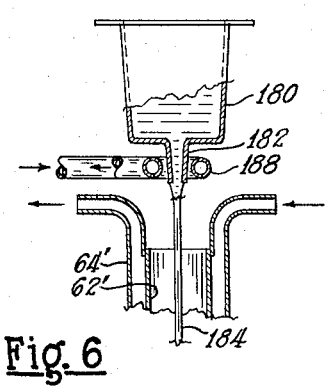
FIGURE 6 is a fragmentary sectional view of a stream feeder apparatus illustrating a means of metering or controlling the flow rate of a stream of heat-softened material delivered into the rotating chamber.

The filament or fiber-forming material may be delivered into the rotor onto the platform 95 in a pre-heated or molten condition. FIGURE 6 illustrates means for delivering a stream of molten or pre-softened filament-forming material into a rotor. The arrangement embodies a feeder or bushing 180 containing a supply of heat-softened glass which may be maintained in flowable condition by electric heating means, or the feeder may be connected with a conventional forehearth containing a supply of molten material.

The feeder 180 is provided with a depending projection 182 having an orifice through which a stream 184 of the material flows into the guide tube 62′ surrounded by a cooling jacket 64′ of the character illustrated in FIGURE 2.

Means is provided for metering, controlling or restricting the flow of material through the orificed projection 182. As shown in FIGURE 6, a circular shaped coil 188 of tubing may be disposed concentric with and surrounding the projection 182, the tubular coil being connected with a supply of coolant fluid as, for example, water.

By controlling the temperature of the water and rate of flow of the water through the coil 188 the temperature of the projection 182 may be varied and hence the viscosity of the glass flowing through the projection may be metered or controlled to increase or decrease the amount of glass or flow rate of glass of the stream 184. Other control means may be employed for the purpose as, for example, the temperature of the material within the feeder 180 may be varied by varying the electric energy directed through the feeder thereby changing the temperature and viscosity of the material in the feeder and hence the flow rate of glass through the orifice projection 182 may be controlled or metered. The glass stream 184 impinges on the platform 95, shown in FIGURE 2, and is projected by centrifugal forces onto the inner surface of the wall 36 of the rotor to form a minutely thin film. Where the material delivered into the rotor is in a molten or heat-softened state, the induction heaters 102 and 176 provide a means for maintaining and stabilizing the temperature of the glass of the film in the rotor.

The conditions under which the hollow fibers are formed differ substantially from methods of producing fibers having solid cross-section. As hereinbefore described, the delivery of flow rate of the fiber or filament forming material into the rotor or chamber 34 is metered or restricted whereby the rotor or chamber is partially starved of material so as to provide only a comparatively thin film of the material on the inner wall of the orificed region of the rotor. Another important factor in the formation of hollow fibers or filaments is the temperature at which the hollow streams of material are attenuated to hollow or tubular fibers or filaments by centrifugal forces. It has been found that the hollow filament or fiber is formed by attenuating the glass at a lower temperature than is conventional in the formation of solid filaments or fibers. The attenuation is carried on with the glass at a temperature of about 1910° F. or slightly higher at which temperature the glass is thick or viscous. It is believed that the centrifugal forces set up by rotation of the rotor substantially exceeds or overcomes the surface tension of the viscous glass to an extent that the glass in the region of an orifice does not bridge the orifice and, as the amount of glass adjacent the orifice is restricted providing only a minutely thin film, the glass moves through the orifice as a stream of annular cross-section with the central region or void being filled with air sucked into the central region by the outwardly moving glass.

The suction apparently is established by reduced pressure existing within the hollow stream filling the void which is perpetuated by continuous attenuation of the hollow glass stream so that the air in the rotor is continuously impelled by such differential pressure to occupy the central region resulting in the hollow filament or fiber formation. It is found that fine hollow filaments or fibers having exterior diameters of but a few microns may be formed having voids or central spaces up to about fifty percent of the total cross-sectional area of the hollow filament including the void. The cross-sectional area of the void of the hollow filament or fiber may be varied depending upon the composition of the glass employed, the amount of glass available at the orifice and the temperature at which the glass is attenuated. It is found that increasing the temperature of the glass tends to decrease the cross-sectional area of the void in the hollow filament or fiber.

While the orifices in the rotor are of circular cross-section, it has been found that while some of the hollow fibers or filaments are of substantially circular cross-section, there is a tendency for the hollow filaments to be formed in elliptical cross-sectional shapes. This is believed to be due to the frictional drag of the air adjacent the rotor which is rotating at comparatively high speed.

The hollow fibers or filaments formed by the above described method are substantially continuous. They may be collected in a mass, as shown in FIGURE 1 and the mass sized or compressed to form a mat of insulating material of desired thickness, the mass or mat being provided with a suitable binder which is cured to impart mass integrity to the mat.

The mass of fibers may be compressed to a high density to produce a substantially rigid board, the fibers having a binder applied thereto and the binder cured while the mass is compressed to board thickness. The substantially continuous filaments may be broken up into staple fibers or fibers of varying lengths by directing blasts of air against the continuous filaments or by other suitable means.

The hollow fibers or filaments are endowed with certain structural advantages, particularly, where the same are used in forming insulating mats, batts or high density insulating boards. The fibers may be used to form a substantially rigid insulating board of increased strength over solid fibers with a reduction in thermal conductivity and weighing substantially less than a comparable board formed of solid fibers. The latter advantage is attained by reason of the voids in the hollow fibers which may be up to approximately fifty percent of the total cross-sectional area of the fibers, the outside diameters of the hollow fibers being substantially equal to or less than conventional solid fibers or filaments.

In a mat where the hollow fibers are arranged haphazardly or at random, but generally parallel to the faces of the board, the hollow fibers act structurally as beams, and those which are oriented transversely in the mat, act as columns. Thus a mat or board formed of the hollow fibers or filaments is endowed with improved strength characteristics over a comparable mat of solid fibers and with a substantial reduction in weight.

It is apparent that, within the scope of the invention, modifications and different arrangements may be made other than as herein disclosed, and the present disclosure is illustrative merely, the invention comprehending all variations thereof.

We claim:

1. The method of forming attenuated hollow fibers of glass including the steps of delivering glass into a hollow chamber having an orificed surface, applying just sufficient heat to the glass in the chamber to maintain the glass at a relatively high viscosity, restricting delivery of glass into the chamber to maintain on the orificed surface a thin film of glass of a thickness sufficient to cover the surface, rotating the surface to exert centrifugal forces effective to deliver the glass of the film and air from the interior of the chamber through the orifices in the form of tubular bodies of glass, and applying forces to the tubular bodies to attenuate the bodies to hollow fibers.

2. The method of forming attenuated hollow fibers including the steps of delivering glass onto an elevated platform in a hollow rotatable rotor having an orificed wall, distributing the glass from the platform to the orificed wall, heating the glass in the rotor just enough to maintain the glass at a relatively high viscosity, restrictively metering the delivery of glass into the rotor to maintain continuously at the wall a thin film of glass of a thickness sufficient to cover the wall, rotating the rotor at a speed to develop centrifugal forces effective to overcome surface tension of the glass at the orifices and establish air movement in the rotor whereby to project the glass of the film and air through each of the orifices to form a thin-walled tube of glass, and attenuating the tubes to hollow glass fibers under the influence of rotation of the rotor.

3. The method of forming attenuated hollow glass fibers including flowing a stream of glass from a supply into a hollow rotor having a peripheral orificed surface, applying just sufficient heat to the glass in the rotor to maintain the glass at a relatively high viscosity, dissipating heat from the stream of glass to regulate the delivery of glass into the rotor to maintain on the peripheral surface a film of glass of a thickness sufficient to cover the surface, rotating the rotor at a speed to develop centrifugal forces effective to overcome surface tension of the glass and establish air movement in the rotor whereby to project the glass of the film and air through each of the orifices to form a thin-walled tubular body, and attenuating the tubular bodies to hollow fibers under the influence of rotation of the rotor.

4. The method of claim 3 wherein a heat-absorbing fluid is circulated in heat-transferring relation with the glass stream for dissipating heat from the stream.

5. The method of forming attenuated hollow fibers of glass including the steps of delivering glass composition into a rotatable chamber having an orificed wall region, applying just enough heat to the chamber to provide glass at a relatively high viscosity therein, restrictively metering the delivery of the glass composition into the chamber to maintain at orificed wall regions a thin film of glass of a thickness sufficient to cover the wall region, rotating the chamber at a speed to develop centrifugal forces sufficient to project the glass of the film and air from the chamber through the orifices and to overcome the surface tension of the glass at the orifices whereby the glass delivered through each orifice forms a thin-walled tube, and attenuating the tubes by rotation of the chamber into hollow fibers.

6. The method of forming attenuated hollow glass fibers including flowing a stream of glass from a supply into a hollow rotor having a peripheral orificed surface, maintaining the glass in the rotor at a relatively high viscosity, regulating the delivery of glass into the rotor to maintain on the peripheral surface a film of glass of a thickness sufficient to cover the surface, rotating the rotor at a speed to develop centrifugal forces effective to establish air movement in the rotor whereby to project the glass of the film and air through each of the orifices to form a thin-walled tubular body, and attenuating the tubular bodies to hollow fibers under the influence of rotation of the rotor.

References Cited by the Examiner

UNITED STATES PATENTS

| | | | |
|---|---|---|---|
| 1,990,434 | 2/1935 | Kohler | 154—44 |
| 2,629,969 | 3/1953 | Peyches | 65—8 |
| 2,830,000 | 4/1958 | Labino | 154—44.15 |
| 2,916,773 | 12/1959 | Vonnegut | 65—8 |
| 2,965,925 | 12/1960 | Dietzsch | 65—1 |
| 3,040,377 | 6/1962 | Slayter et al. | |

DONALL H. SYLVESTER, *Primary Examiner.*

MORRIS SUSSMAN, *Examiner.*

G. R. MYERS, *Assistant Examiner.*